INVENTORS
STEPHEN F. ADAM
RICHARD W. ANDERSON
DAVID R. VETERAN

BY A. C. Smith

ATTORNEY

INVENTORS
STEPHEN F. ADAM
RICHARD W. ANDERSON
DAVID R. VETERAN
BY A. C. Smith
ATTORNEY

1

3,500,263
PARALLEL-PLATE PERPENDICULAR STRIP CENTER CONDUCTOR TEM-MODE TRANSMISSION LINE APPARATUS

Stephen F. Adam, Richard W. Anderson, and David R. Veteran, Los Altos, Calif., assignors to Hewlett-Packard Company, Palo Alto, Calif., a corporation of California

Filed Aug. 16, 1967, Ser. No. 661,114
Int. Cl. H01p 3/06, 3/08
U.S. Cl. 333—84 9 Claims

ABSTRACT OF THE DISCLOSURE

A strip center conductor of a TEM-mode signal transmission line is maintained equidistant between a pair of parallel ground plane conductors with the major axis of its cross section perpendicular to said ground planes and the strip conductor is selectively positionable between the conductors to serve as a delay line or switch contact element.

BACKGROUND OF THE INVENTION

TEM-mode signal transmission, as presently accomplished using coaxial, slab or strip line methods requires the maintenance of the center conductor at the exact center of the coaxial shield or centered between the parallel planes. In addition, the center conductor must be substantially uniform throughout its cross section because voids or openings alter the high frequency electrical properties of the line. This alteration of line electrical characteristics by center conductor movement or discontinuity is especially critical in the design of switches and delay lines where contact displacement or support holes in the center conductor is required.

Certain known conventional types of TEM-mode switches for application at microwave frequencies typically possess some of the required characteristics of microwave switches, but often other desired parameters must be sacrificed to achieve these required characteristics. For example, a rotating coaxial-line section switch, while giving high isolations, low insertion loss, and VSWR, sacrifices long life and switching speed. Normal microwave switches with blade-type contacting elements have a long life and fast switching speed, but isolation and frequency range are not acquired. Solid state switches achieving high switching speed, long life and small size, sacrifice isolation, insertion loss, power handling capability and bandwidth.

SUMMARY OF THE INVENTION

According to the illustrated embodiment, the present invention includes a strip center conductor which is disposed equidistant between a pair of parallel ground plane conductors and which is oriented with the major axis of the cross section of the strip conductor perpendicular to the ground planes.

Since substantially all the electric field lines for signal on the strip conductor are concentrated between the strip conductor and the ground plane conductors, the signal travels primarily along the edges of the strip conductor near the ground planes. Therefore holes or indentations can be placed along the length of the strip conductor where desired without affecting the electrical properties of the transmission line. Also, little change will result in the electrical properties of the transmission line from motion of the strip conductor in a plane parallel to the ground planes since the spacing of the edges of the strip conductor from the ground planes remains essentially unchanged. Thus, the strip conductor may also be folded back over itself in a serpentine manner to form a delay line with the folded strip conductor positioned intermediate the ground planes.

2

A microwave switch having selected electrical properties can be constructed using the strip conductor of the present invention as the contect element which is disposed to move in a plane which is parallel to and equidistantly spaced from the ground planes. Since the cross section of the strip conductor is maintained perpendicular to the ground planes and the edges of the strip conductor are maintained a constant distance from the ground planes, the electrical properties of the switch remain substantially unchanged as the strip conductor moves in a plane which is parallel to the ground planes. The contact element is deflected between switch poles by mechanical or electrical solenoid means.

If the ground plane conductors are not large enough to provide effectively infinite plane characteristics in which all electric field lines terminate on the ground plane conductors, a wave-absorbing material such as Polyiron can be placed between the ground planes about the edges thereof to absorb higher order wave modes and to make the ground planes "appear" infinite to a signal on the contact element.

The switch thus provides low voltage standing wave ratio (VSWR), low insertion loss and high isolation.

DESCRIPTION OF THE PREFERRED EMBODIMENT

Figure 1:
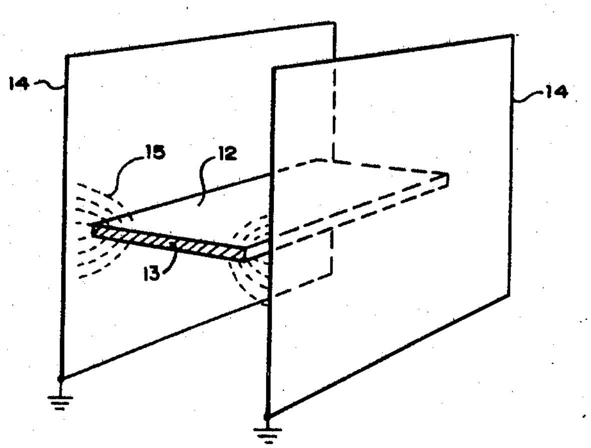
FIGURE 1 is a perspective view of the preferred embodiment of the invention illustrating the relative positions of the transmission line elements and the field distribution between them.

Referring now to FIGURE 1, there is shown a strip center conductor 12 which is positioned equidistant between two parallel ground plane conductors 14 with the major axis of its cross section 13 perpendicular to the ground planes. A high frequency TEM-mode signal propagates along this transmission line with a field distribution, as illustrated by electric field lines 15, which is concentrated substantially between the edges of the strip conductor and the adjacent ground planes.

Figure 2:
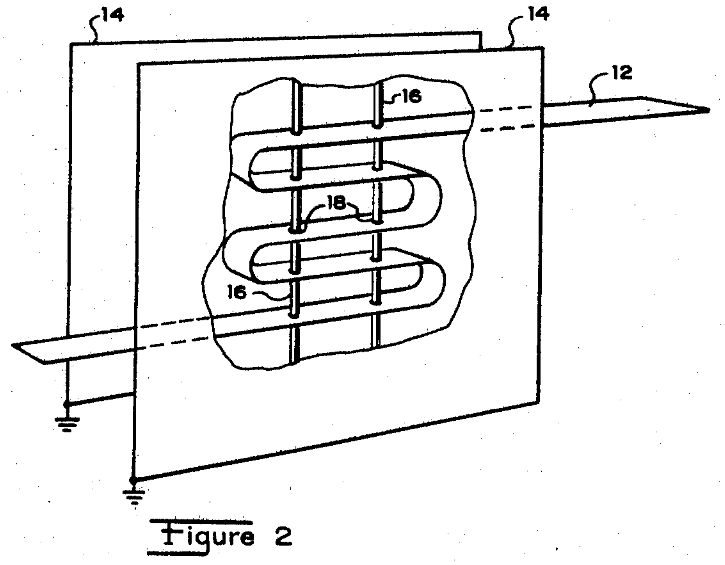
FIGURE 2 is a cutaway drawing of one embodiment of the invention arranged to operate as a delay line.

FIGURE 2 shows a cutaway view of a delay line which includes a strip conductor 12 mounted in a serpentine pattern within the common area between ground planes 14. The strip conductor 12 is so mounted on support bars 16 which protrude through support holes 18 in the strip conductor that the major axis of the cross section of the strip conductor is substantially perpendicular to ground planes 14. Since the field distribution is concentrated near the edges of center conductor 12, the support holes 18 do not significantly alter the electrical characteristics of the signal transmission line thus formed.

Figures 3, 4, 5:
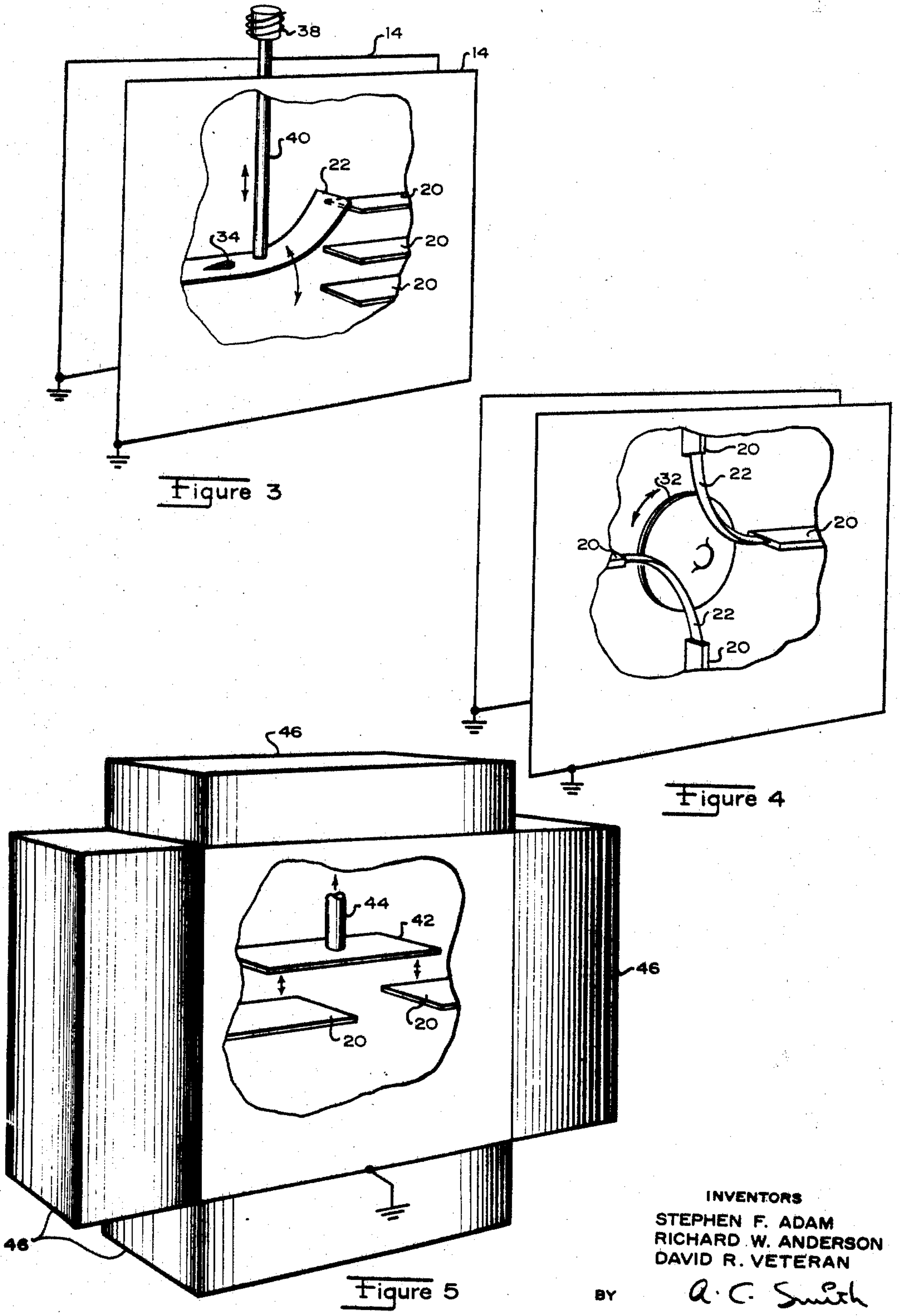
FIGURES 3, 4, and 5 are cutaway drawings of other embodiments of the invention arranged to operate as microwave switches.

Referring now to FIGURE 3, there is shown a TEM-mode signal switch mechanism including signal poles 20 disposed in a plane within the common area between ground planes 14. The contact strip element 22 is a section of the strip conductor 12 of the transmission line of FIGURE 1 and is positioned with the major axis of its cross section perpendicular to ground planes 14. This contact strip element is movable in the common plane of the signal poles 20 for making and breaking contact with one or more of signal poles 20. The teardrop-shaped hole 34 in strip conductor element 22 allows the element 22 to flex in the region about the hole 34 instead of at the rigid point of support. Since the element 22 is oriented substantially perpendicular to ground planes 14, the hole 34 does not substantially alter the electrical properties of the signal transmission line. The contact element 22 may be moved between switch poles by the solenoid 38 which is coupled to the element 22 through the nonconductive link 40. Thus, when the solenoid is energized, element 22 deflects in a plane parallel to ground planes 14.

FIGURE 4 shows an embodiment of a multiple-pole switch in accordance with the present invention in which a rotary element 32 rotates the contact elements 22 around an axis that is perpendicular to the common plane to contact two or more of signal poles 20 at the same time.

FIGURE 5 shows another embodiment of a switch in accordance with the present invention in which a rigid contact element 42 is selectively moved into contact with poles 20 by movement of the attached bar 44. The contact element 42 is constrained to move only in the common plane of signal poles 20 and to remain oriented with the major axis of the cross section of element 42 perpendicular to the ground planes. Wave-absorbing material 46, such as Polyiron, is disposed away from the region of the signal conductors and intermediate the ground planes. This wave-absorbing material absorbs the higher order modes of wave energy and increases the "infinite" appearance of the ground planes as "seen" by signals on the contact element, thereby keeping the field distribution concentrated between the contact element and the ground planes.

What is claimed is:

1. TEM-mode transmission line apparatus comprising:
- a pair of parallel ground plane conductors disposed a selected distance from one another and having a common area;
- a conductive strip element having a cross section with major and minor axes, disposed intermediate said ground plane conductors in the common area with the major axis of its cross section substantially perpendicular to said ground plane conductors;
- said conductive strip element and ground plane conductors having a field distribution between them for a signal on the conductive strip element with respect to the ground plane conductors that is concentrated substantially entirely between said conductive strip element and the ground plane conductors.

2. Transmission line apparatus as in claim 1 wherein said conductive strip element is disposed along a nonlinear path with its cross sectional major axis maintained substantially perpendicular to said ground plane conductors over the length of said conductive strip.

3. Transmission line apparatus as in claim 1 wherein said conductive strip element has at least one opening along its length axis.

4. TEM transmission line apparatus as in claim 1 comprising:
- a plurality of signal poles positioned in said common area between said ground planes and in a common plane which is parallel to and substantially equidistant from both of said ground plane conductors; and
- actuating means for moving said conductive strip element in said common plane to selectively connect a pair of signal poles, with the major axis of the cross section of said element maintained substantially perpendicular to said common plane.

5. Transmission line apparatus as in claim 4 wherein said conductive strip element is deflectable.

6. Transmission line apparatus as in claim 4 wherein wave-absorbing material is disposed outside the common area, intermediate the ground planes, and away from said conductive strip element and signal poles.

7. Transmission line apparatus as in claim 4 wherein said actuating means includes an electromagnetic solenoid located outside the common area between said ground planes and mechanically coupled to transfer solenoid motion to the conductive strip.

8. Transmission line apparatus as in claim 4 wherein said conductive strip element is rotated around a specified axis parallel to the major axis of its cross section for selectively contacting at least two of said signal poles.

9. Transmission line apparatus as in claim 1 wherein:
- said strip element is supported for movement of at least a portion thereof within the common area of said ground plane conductors along a path between said ground plane conductors which is substantially coplanar therewith and which preserves said field distribution substantially unaltered as a function of movement of the strip element along said path; and
- connection means for connecting to said strip element for applying electrical signal thereto.

References Cited

UNITED STATES PATENTS 2,231,602 2/1931 Southworth ---------- 333—96

FOREIGN PATENTS 909,709 4/1954 Germany.

HERMAN K. SAALBACH, Primary Examiner

L. ALLAHUT, Assistant Examiner

U.S. Cl. X.R.

333—10, 30, 96, 98